(12) United States Patent
Kimura et al.

(10) Patent No.: US 10,496,077 B2
(45) Date of Patent: Dec. 3, 2019

(54) NUMERICAL CONTROLLER

(71) Applicant: FANUC CORPORATION, Minamitsuru-gun, Yamanashi (JP)

(72) Inventors: Satoshi Kimura, Yamanashi (JP); Akira Kanemaru, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/956,314

(22) Filed: Apr. 18, 2018

(65) Prior Publication Data

US 2018/0314236 A1    Nov. 1, 2018

(30) Foreign Application Priority Data

Apr. 27, 2017 (JP) .................. 2017-088433

(51) Int. Cl.
*G05B 19/414* (2006.01)

(52) U.S. Cl.
CPC ................. *G05B 19/4141* (2013.01)

(58) Field of Classification Search
None
See application file for complete search history.

(56) References Cited

U.S. PATENT DOCUMENTS

2005/0055109 A1    3/2005  Nagashima et al.

FOREIGN PATENT DOCUMENTS

| JP | 0934529 A | 2/1997 |
|---|---|---|
| JP | 2000076087 A | 3/2000 |
| JP | 2001034320 A | 2/2001 |
| JP | 2001101070 | 4/2001 |
| JP | 2005084800 A | 3/2005 |
| JP | 2006004067 A | 1/2006 |
| JP | 2006024185 A | 1/2006 |

OTHER PUBLICATIONS

Decision to Grant a Patent for Japanese Application No. 2017-088433, dated Aug. 28, 2018, with translation, 6 pages.

*Primary Examiner* — Carlos R Ortiz Rodriguez
(74) *Attorney, Agent, or Firm* — RatnerPrestia

(57) ABSTRACT

A numerical controller generates a machine configuration table in which function modules to be enabled are set based on an option or a parameter, a memory management table for managing a memory usage, and a performance management table for managing a CPU use rate. The numerical controller determines selected numbers of the function modules, based on the machine configuration table, memory management table, and performance management table, generates a module selection table, and attaches and detaches the function modules according to the selected numbers of the function modules. In this way, resources are assigned to a plurality of function modules.

4 Claims, 9 Drawing Sheets

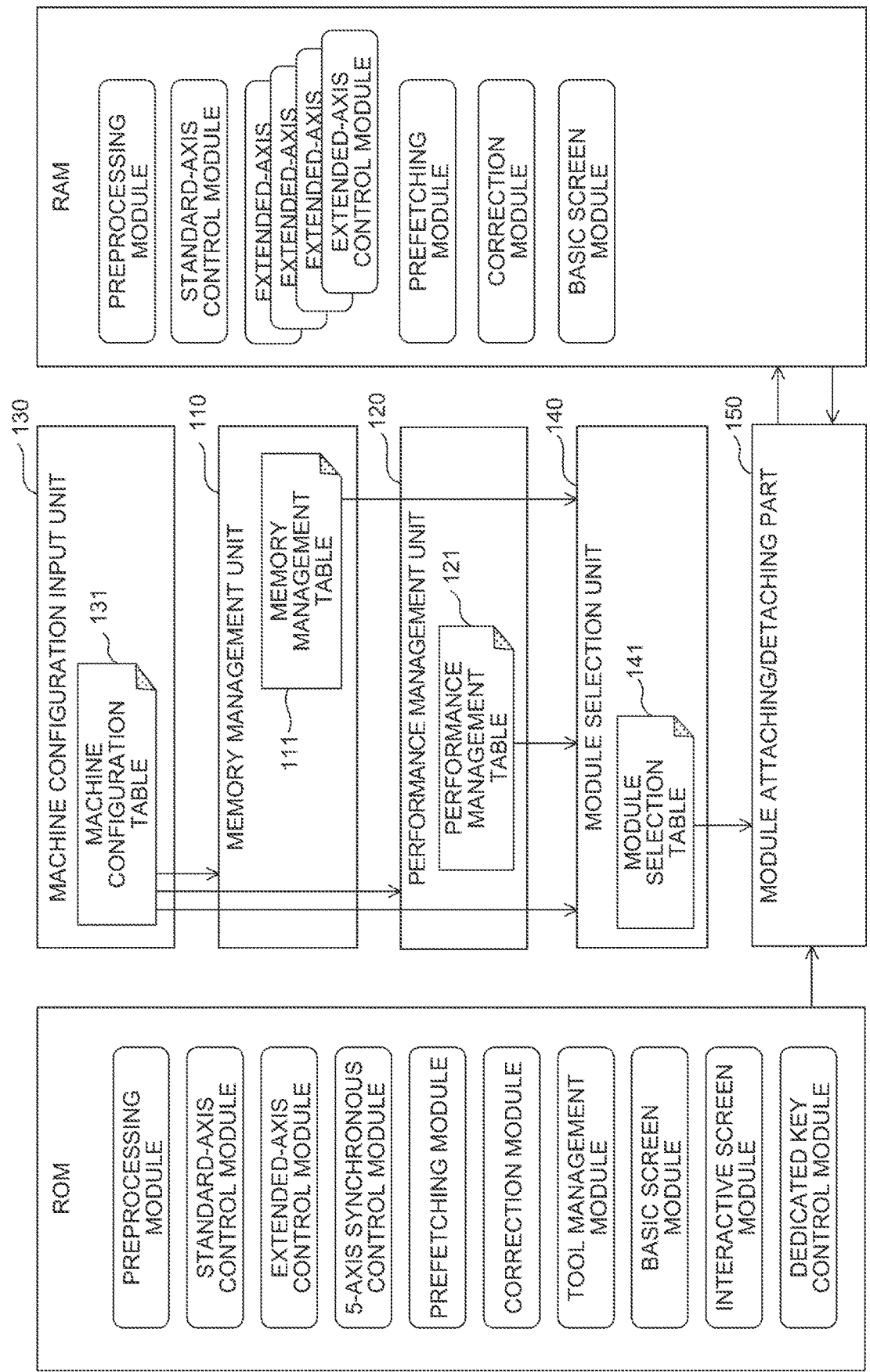

| MACHINE CONFIGURATION TABLE ||||||
| --- | --- | --- | --- | --- |
| FUNCTION MODULE NO. | FUNCTION MODULE | SELECTED NUMBER | EXPAND PRIORITY | SELECTED NUMBER UPPER LIMIT VALUE |
| 1 | PREPROCESSING MODULE | 1 | 2 | 10 |
| 2 | STANDARD-AXIS CONTROL MODULE | 1 | 0 | 0 |
| 3 | EXTENDED-AXIS CONTROL MODULE | 2 | 0 | 45 |
| 4 | PREFETCHING MODULE | 1 | 1 | 10 |
| 5 | CORRECTION MODULE | 1 | 0 | 5 |
| 6 | BASIC SCREEN MODULE | 1 | 0 | 0 |

| MEMORY MANAGEMENT TABLE |||||
| --- | --- | --- | --- | --- |
| FUNCTION MODULE NO. | FUNCTION MODULE | SELECTED NUMBER | MEMORY USAGE (MB) | FREE MEMORY AMOUNT (MB) |
| 1 | PREPROCESSING MODULE | 1 | 20 | 84 |
| 2 | STANDARD-AXIS CONTROL MODULE | 1 | 30 | |
| 3 | EXTENDED-AXIS CONTROL MODULE | 2 | 5 | |
| 4 | PREFETCHING MODULE | 1 | 10 | |
| 5 | CORRECTION MODULE | 1 | 20 | |
| 6 | BASIC SCREEN MODULE | 1 | 50 | |

FIG. 4

| PERFORMANCE MANAGEMENT TABLE | | | | |
|---|---|---|---|---|
| FUNCTION MODULE NO. | FUNCTION MODULE | SELECTED NUMBER | CPU USE RATE (%) | FREE CPU USE RATE (%) |
| 1 | PREPROCESSING MODULE | 1 | 10 | 35 |
| 2 | STANDARD-AXIS CONTROL MODULE | 1 | 15 | |
| 3 | EXTENDED-AXIS CONTROL MODULE | 2 | 5 | |
| 4 | PREFETCHING MODULE | 1 | 10 | |
| 5 | CORRECTION MODULE | 1 | 5 | |
| 6 | BASIC SCREEN MODULE | 1 | 5 | |

FIG. 6

MODULE SELECTION TABLE — 141

| FUNCTION MODULE NO. | FUNCTION MODULE | SELECTED NUMBER | EXPAND PRIORITY | SELECTED NUMBER UPPER LIMIT VALUE | MEMORY USAGE (MB) | FREE MEMORY AMOUNT (MB) | CPU USE RATE (%) | FREE CPU USE RATE (%) |
|---|---|---|---|---|---|---|---|---|
| 1 | PREPROCESSING MODULE | 3 | 2 | 10 | 20 | 34 | 10 | 5 |
| 2 | STANDARD-AXIS CONTROL MODULE | 1 | 0 | 0 | 30 | | 15 | |
| 3 | EXTENDED-AXIS CONTROL MODULE | 2 | 0 | 45 | 5 | | 5 | |
| 4 | PREFETCHING MODULE | 2 | 1 | 10 | 10 | | 10 | |
| 5 | CORRECTION MODULE | 1 | 0 | 5 | 20 | | 5 | |
| 6 | BASIC SCREEN MODULE | 1 | 0 | — | 50 | | 5 | |

FIG. 7

MODULE SELECTION TABLE 141

| FUNCTION MODULE NO. | FUNCTION MODULE | SELECTED NUMBER | EXPAND PRIORITY | SELECTED NUMBER UPPER LIMIT VALUE | MEMORY USAGE (MB) | FREE MEMORY AMOUNT (MB) | CPU USE RATE (%) | FREE CPU USE RATE (%) |
|---|---|---|---|---|---|---|---|---|
| 1 | PREPROCESSING MODULE | 2 | 1 | 10 | 30 | 54 | 20 | 15 |
|  | PREFETCHING MODULE | 2 |  |  |  |  |  |  |
| 2 | STANDARD-AXIS CONTROL MODULE | 1 | 0 | 0 | 30 |  | 15 |  |
| 3 | EXTENDED-AXIS CONTROL MODULE | 2 | 0 | 45 | 5 |  | 5 |  |
| 4 | CORRECTION MODULE | 1 | 0 | 5 | 20 |  | 5 |  |
| 5 | BASIC SCREEN MODULE | 1 | 0 | — | 50 |  | 5 |  |

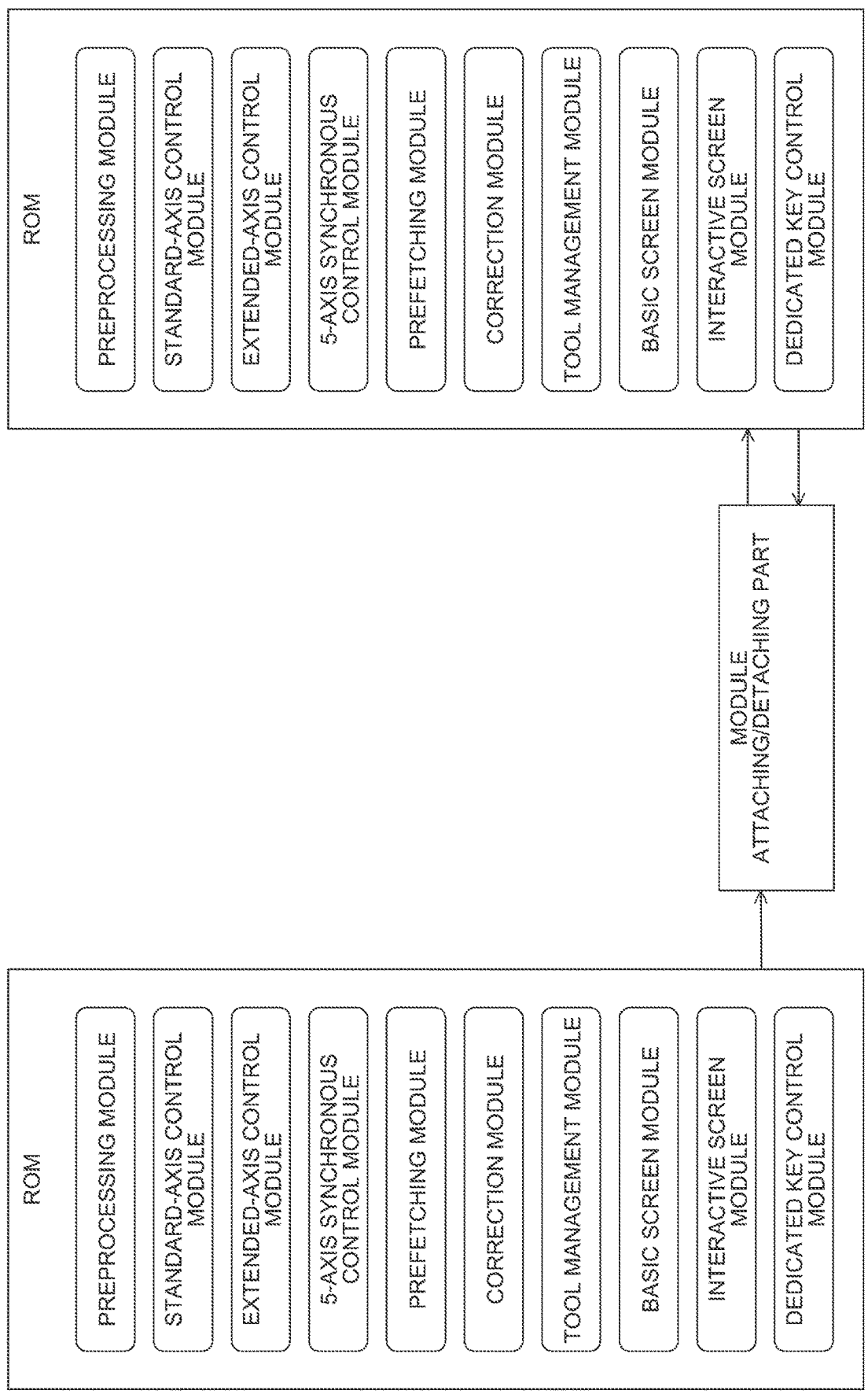

NUMERICAL CONTROLLER

CROSS-REFERENCE TO RELATED APPLICATION

This application is a new U.S. Patent Application that claims benefit of Japanese Patent Application No. 2017-088433, filed Apr. 27, 2017, the disclosure of this application is being incorporated herein by reference in its entirety for all purposes.

BACKGROUND OF THE INVENTION

Field of the Invention

The present invention relates to a numerical controller, and more particularly, to a numerical controller capable of performing optimum resource management.

Description of the Related Art

In recent years, there are various types of machine tools, such as lathes, grinders, and machining centers, and these machine tools are becoming more diverse in their respective fields, depending on the use and purpose. For example, there are machines specialized in multi-axis control and those specialized in high-precision machining based on an increase in predicted number, and the like. Thus, the market has come to demand the development of machine tools specialized in specific functions. In response to this, machine manufacturers have started to provide unique characteristic designs.

If a conventional general-purpose machine tool is simply additionally equipped with software for implementing these characteristic functions, more system resources (typically, CPU use rate, memory usage, etc.) than in the conventional case are required. However, increasing the upper limit of the number of system resources directly results in an increase in cost.

In this regard, Japanese Patent Application Laid-Open No. 09-034529 discloses an NC controller for industrial machinery, which is provided with a packaged application comprising an input system unit and a control system unit. The input system unit is used in common for all industrial machines. The control system unit comprises a plurality of blocks modularized for each industrial machine and serves to select predetermined blocks corresponding to a target industrial machine and control various actuators of the machine concerned.

Thus, Japanese Patent Application Laid-Open No. 09-034529 discloses the NC controller equipped with modules specialized for specific functions. However, there is no specific description in Japanese Patent Application Laid-Open No. 09-034529 as to how to perform resource management with use of these modules.

Actually, control software of a conventional numerical controller assigns all functions on a single memory map (see FIG. 10). Except for general-purpose functions, however, actually available ones of assigned function modules are restricted to those modules which are associated with specific functions selected by a user based on options and parameters. Specifically, the conventional numerical controller statically determines resources for individual functions, so that even unused functions can be resident on a RAM. Consequently, a problem arises that an unnecessary memory area is consumed or the load on a CPU is increased.

On the other hand, in a numerical controller of a machine tool, as in a general-purpose OS, it is technically feasible to dynamically attach and detach modules or simultaneously execute a plurality of parts of a single application. If this configuration is employed, however, a problem arises that resources mounted on the numerical controller are inevitably used nearly to their limit, so that the response is reduced, and in the worst case, the operation of the application stops. The occurrence of such problems is unacceptable to embedded software such as that in the numerical controller, unlike the general-purpose software.

Faced with this dilemma, the conventional numerical controller has problems as follows:

Since it performs static resource assignment, it cannot dynamically effectively utilize resources of unnecessary functions, so that it lacks in expandability and cannot easily design a highly unique machine.

If hardware is used to solve this problem, required specifications are enhanced, so that the cost increases.

In a method for solving the above problem by means of software, on the other hand, dedicated software may be created such that modules related to low-priority functions are reduced. According to this method, however, different pieces of software should be developed individually for models, so that costs for development and management increase. Moreover, the numerical controller is limited in available functions, so that its convenience is lowered.

SUMMARY OF THE INVENTION

The present invention has been made to solve these problems and its object is to provide a numerical controller capable of performing optimum resource management.

A numerical controller according to the present invention assigns resources to a plurality of function modules. The numerical controller comprises a machine configuration input unit configured to generate the machine configuration table in which the function modules to be enabled are set based on an option or a parameter selected by a user, a memory management unit configured to generate a memory management table for managing a memory usage, a performance management unit configured to generate a performance management table for managing a CPU use rate, a module selection unit configured to determine selected numbers of the function modules, based on the machine configuration table, the memory management table, and the performance management table, and generate a module selection table, and a module attaching/detaching part configured to attach and detach the function modules according to the selected numbers of the function modules.

The machine configuration input unit may generate the machine configuration table in which the function modules to be enabled and the selected numbers, priorities, and selected number upper limit values of the function modules are set.

The memory management unit may generate the memory management table for managing the memory usage and a free memory amount.

The performance management unit may generate the performance management table for managing the CPU use rate and a free CPU use rate.

According to the present invention, there can be provided a numerical controller capable of performing optimum resource management.

BRIEF DESCRIPTION OF THE DRAWINGS

FIG. 1 is a block diagram showing the configuration of a numerical controller according to an embodiment of the present invention;

FIG. 2 is a diagram showing an example of a machine configuration table;

FIG. 3 is a diagram showing an example of a memory management table;

FIG. 4 is a diagram showing an example of a performance management table;

FIG. 6 is a diagram showing an example of a module selection table;

FIG. 7 is a diagram showing an example of the module selection table;

FIG. 10 is a diagram showing how all functions are assigned to a single memory map by control software of the conventional numerical controller.

DETAILED DESCRIPTION OF THE PREFERRED EMBODIMENTS

Figure 5:
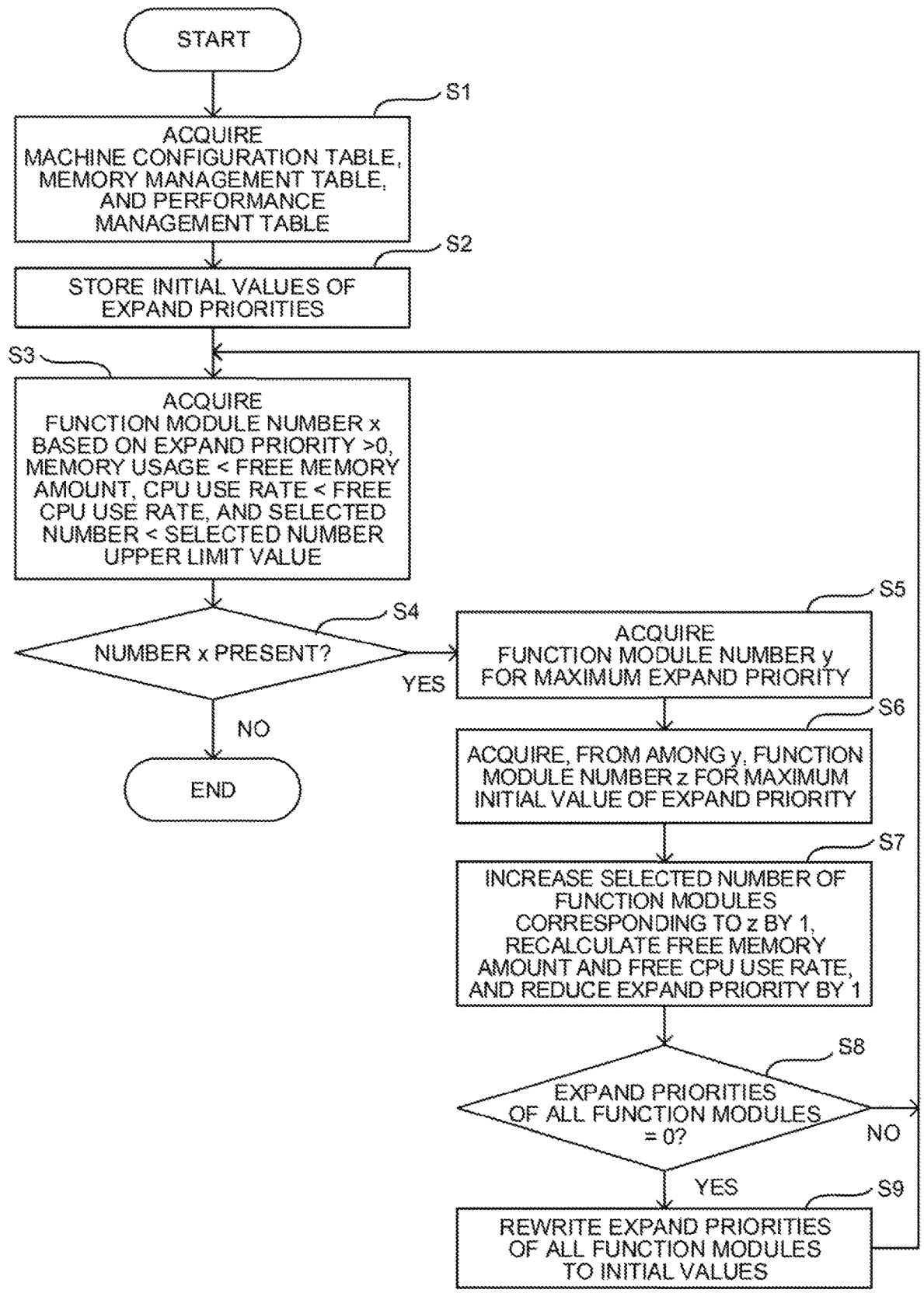
FIG. 5 is a flowchart showing processing performed by a module selection unit.

The configuration of a numerical controller 100 according to an embodiment of the present invention will first be described with reference to the block diagram of FIG. 1.

The numerical controller 100 comprises a memory management unit 110, performance management unit 120, machine configuration input unit 130, module selection unit 140, and module attaching/detaching part 150.

The machine configuration input unit 130 acquires information on options and parameters selected by a user. The numerical controller 100 typically comprises an interface for urging the user to perform selection of an option for enabling or disabling a specific function, setting a parameter that affects the performance of the enabled function, and the like. Specifically, the outline of a resource usage is determined by the option and the upper limit of actual use of a resource within the range of the usage is determined by the parameter. A specific example of the parameter sets the number of blocks that can be prefetched by a prefetching module of a machining program. In machining on a machining path formed of short continuous line segments, the performance is improved by performing multi-block prefetching.

The machine configuration input unit 130 generates a machine configuration table 131 based on the information on options and parameters selected by the user. As shown in FIG. 2, the machine configuration table 131 is a table that defines function modules required to implement functions selected (or enabled) by the user and selected numbers, expand priorities, and selected number upper limit values of the function modules. The following is a description of the meanings of these items.

Selected Numbers: Values indicative of the names of the function modules to which resources should be assigned and the numbers of their instances. The machine configuration input unit 130 is previously stored with the correspondence of specifications designated by the options and the parameters to the function modules required to satisfy the specifications and their minimum selected numbers. The machine configuration input unit 130 identifies the required function modules and their minimum selected numbers in accordance with the options and the parameters selected by the user and sets them as initial values in the machine configuration table 131.

Selected Number Upper Limit Values: Values indicative of the maximum values to which the selected numbers of the function modules can be expanded. The machine configuration input unit 130 is previously stored with the upper limit values of the numbers of systematically selectable modules for the individual function modules. The systematic upper limit values may be designed so that they can be reduced by the user's setting.

Expand Priorities: Values indicative of the priorities in the resource assignment for the function modules. This item is a user-settable item such that the user can set a higher priority for a function that is expected to be enforced. Final selected numbers are determined by processing described later in accordance with the set expand priority.

The memory management unit 110 generates a memory management table 111 based on the machine configuration table 131. The memory management table 111 shown in FIG. 3 is a table for managing memory amounts required in a machine configuration defined by the machine configuration table 131 and a free memory amount. The memory management unit 110 is previously stored with a memory usage FUN_Mx that is required with every selection of one function module. An available total memory amount MAX_M is determined by a hardware configuration. Of the available total memory amount MAX_M, moreover, a memory amount RSV_M to be reserved without being used for the resource assignment may be allowed to be specified by the user's setting. As this is done, a free memory amount REM_M for the case in which the memory is assigned to all the function modules set in the machine configuration table 131 can be defined by the following equation. The free memory amount REM_M is a memory amount that can be used in expansion processing described later.

$$REM\_M = MAX\_M - (FUN\_M1 + \ldots) - RSV\_M.$$

The performance management unit 120 generates a performance management table 121 based on the machine configuration table 131. The performance management table 121 shown in FIG. 4 is a table for managing CPU use rates required in the machine configuration defined by the machine configuration table 131 and a free CPU use rate. The performance management unit 120 is previously stored with a CPU use rate FUN_Ux that is required with every selection of one function module. An upper limit MAX_U of the CPU use rate is assumed to be 100%. Of the upper limit MAX_U of the CPU use rate, moreover, a CPU use rate RSV U to be reserved without being used for the resource assignment may be allowed to be specified by the user's setting. Furthermore, a coefficient for adjusting the difference in processing capability depending on the specifications of a CPU is given by K. This coefficient K is generally determined by a combination of a function module and the type of the CPU or the like, as well as by the processing capability of the CPU. As this is done, a free use rate REM_U for the case in which the CPU use rate is assigned to all the function modules set in the machine configuration table 131 can be defined by the following equation. The free CPU use rate REM_U is a CPU use rate that can be used in the expansion processing described later.

$$REM\_U = 100 - K \times (FUN\_U1 + \ldots) - RSV\_U.$$

The module selection unit 140 performs processing for determining the final selected numbers of the function modules based on the machine configuration table 131, memory management table 111, and performance management table 121. The processing performed by the module selection unit 140 will be described with reference to the flowchart of FIG. 5.

<Step (1)>

Step S1: The module selection unit 140 acquires the machine configuration table 131, memory management table 111, and performance management table 121.

Step S2: The initial values of the expand priorities are stored.

Step S3: The module selection unit 140 acquires a function module number x that satisfies conditions 'expand priority>0', 'memory usage<free memory amount', 'CPU use rate<free CPU use rate' and 'selected number<selected number upper limit value'.

Step S4: If the function module number x that satisfies the conditions of Step S3 exists, the processing proceeds to Step S5. If this function module number x does not exists, this processing ends.

<Step (2)>

Step S5: The module selection unit 140 identifies a function module number of y for the maximum expand priority.

Step S6: The module selection unit 140 acquires a function module number z for the maximum initial value of the expand priority, out of the function module number y identified in Step S5.

<Step (3)>

Step S7: The module selection unit 140 increases the selected number of the function module corresponding to the function module number z acquired in Step S6 by 1 and recalculates the free memory amount and the free CPU use rate. Then, it reduces the expand priority of the function module concerned by 1.

<Step (4)>

Step S8: The module selection unit 140 determines whether or not the expand priorities of all the function modules are 0. If the expand priorities are 0, the processing proceeds to Step S9. If not, the processing proceeds to Step S3.

Step S9: The module selection unit 140 rewrites the expand priorities of all the function modules to the initial values, whereupon the processing returns to Step S3.

The module selection unit 140 determines the final selected numbers of the function modules by a series of processing in Steps (1) to (4) and then loads the result of the determination into a module selection table 141. FIG. 6 shows an example of the module selection table 141.

The processing in Steps (1) to (4) can also be expressed in the following manner. Steps S1 to S9 in the description to follow correspond to Steps S1 to S9, respectively, of Steps (1) to (4). Various variables are defined as follows:

k=1, 2, . . . , n: Function module number,
$M\_k$: Function module k,
$P\_k$: Expand priority of $M\_k$,
$UM\_k$: Memory usage of $M\_k$,
$UC\_k$: CPU use rate of $M\_k$,
EM: Free memory amount,
EC: Free CPU use rate,
$N\_k$: Selected number of $M\_k$,
$L\_k$: Selected number upper limit value of $M\_k$,
$PORG\_k$: Initial value of $P\_k$,
φ: Empty set.

<Step (1)>

Step S1: The module selection unit 140 acquires the machine configuration table 131, memory management table 111, and performance management table 121.

Step S2: $PORG\_k := P\_k$ is given.

Step S3: A={a|a is k that satisfies $P\_k>0$, $UM\_k \le EM$, $UC\_k \le EC$, and $N\_k < L\_k$.} is given.

Step S4: If A=φ is given, this processing ends.

<Step (2)>

Step S5: B={b|b is k that satisfies b∈A and provides maximum $P\_b$.} is given.

Step S6: Among the elements of a set B, that k which maximizes $PORG\_k$ is m.

<Step (3)>

Step S7: $N\_m := N\_m+1$, $EM := EM-UM\_m$, $EC := EC-UC\_m$, $P\_m := P\_m-1$ are given.

<Step (4)>

Step S8: D={d|d is k that satisfies $P\_k>0$} is given.

If D=φ is given, the processing proceeds to Step S9. If not, the processing proceeds to Step S3.

Step S9: $P\_k := PORG\_k$ is given for every k.

Thereafter, the processing proceeds to Step S3.

Specifically, the module selection unit 140 maximally increases the selected numbers of the function modules in accordance with the level (value size) of the expand priority and the ratio of the priority. The module selection unit 140 repeatedly performs operations to check that function module which has the maximum priority, adds 1 to the selected number if the function module is expandable, and lowers the priority for the expanded module by 1. If all the expand priorities are 0, they are restored to the initial values, and a series of processing is repeated again. The module selection unit 140 finishes this processing when there is no function module that can expand relative to the free memory amount and the free CPU use rate.

Example 1

Example 1 specifically shows how k, $P\_k$, $UM\_k$, $UC\_k$, EM, EC, $N\_k$, $L\_k$, and $PORG\_k$ individually change as the module selection unit 140 repeatedly performs the above processing in Steps (1) to (4). Those elements which are changed in the individual stages are shown enclosed in brackets "[ ]". In the description to follow, the elements in "{ }" indicate elements in columns in the memory management table 111 and the performance management table 121 shown in FIGS. 3 and 4, respectively. For example, k={1, 2, 3, 4, 5, 6} and $P\_k$={2, 0, 0, 1, 0, 0} indicate that the expand priorities of the function modules with function module numbers 1, 2, 3, 4, 5 and 6 are 0, 0, 1, 0 and 0, respectively.

<Initial Stage>
k={1, 2, 3, 4, 5, 6}
$P\_k$={2, 0, 0, 1, 0, 0}
$UM\_k$={20, 30, 10, 10, 20, 50}
$UC\_k$={10, 15, 5, 10, 5, 5}
EM=84
EC=35
$N\_k$={0, 0, 0, 0, 0, 0}
$L\_k$={10, 0, 45, 10, 5, 0}
$PORG\_k$={2, 0, 0, 1, 0, 0}

In first processing in Steps (1) to (4), the function module based on k=1 is the object of processing in Step (3).

<After First Stage Processing>
k=i{1, 2, 3, 4, 5, 6}
$P\_k$={[1], 0, 0, 1, 0, 0}
$UM\_k$={20, 30, 10, 10, 20, 50}
$UC\_k$={10, 15, 5, 10, 5, 5}
EM=[64]
EC=[25]
$N\_k$={[1], 0, 0, 0, 0, 0}
$L\_k$={10, 0, 45, 10, 5, 0}
$PORG\_k$={2, 0, 0, 1, 0, 0}

The respective values of the variables are changed as described above by the first processing in Steps (1) to (4). In second processing in Steps (1) to (4), the function module based on k=1 is the object of processing in Step (3).

<After Second Stage Processing>
k={1, 2, 3, 4, 5, 6}
P_k={[0], 0, 0, 1, 0, 0}
UM_k={20, 30, 10, 10, 20, 50}
UC_k={10, 15, 5, 10, 5, 5}
EM=[44]
EC=[15]
N_k={[2], 0, 0, 0, 0, 0}
L_k={10, 0, 45, 10, 5, 0}
PORG_k={2, 0, 0, 1, 0, 0}

The respective values of the variables are changed as described above by the second processing in Steps (1) to (4). In third processing in Steps (1) to (4), the function module based on k=4 is the object of processing in Step (3).

<After Processing in Step S7 of Third Stage>
k={1, 2, 3, 4, 5, 6}
P_k={0, 0, 0, [0], 0, 0}
UM_k={20, 30, 10, 10, 20, 50}
UC_k={10, 15, 5, 10, 5, 5}
EM=[34]
EC=[5]
N_k={2, 0, 0, [1], 0, 0}
L_k={10, 0, 45, 10, 5, 0}
PORG_k={2, 0, 0, 1, 0, 0}

The respective values of the variables are changed as described above by the third processing in Steps (1) to (4).

<After Third Stage Processing>
k={1, 2, 3, 4, 5, 6}
P_k={0, [2], 0, [1], 0, 0}
UM_k={20, 30, 10, 10, 20, 50}
UC_k={10, 15, 5, 10, 5, 5}
EM=[34]
EC=[5]
N_k={2, 0, 0, 1, 0, 0}
L_k={10, 0, 45, 10, 5, 0}
PORG_k={2, 0, 0, 1, 0, 0}

Since P_k for every k is reduced to 0 by the third processing in Step (4), it is reset to the initial value.

<After Processing in Step S4 of Fourth Stage>
k={1, 2, 3, 4, 5, 6}
P_k={0, 2, 0, 1, 0, 0}
UM_k={20, 30, 10, 10, 20, 50}
UC_k={10, 15, 5, 10, 5, 5}
EM=34
EC=5
N_k={2, 0, 0, 1, 0, 0}
L_k={10, 0, 45, 10, 5, 0}
PORG_k={2, 0, 0, 1, 0, 0}

Since no k that satisfies the conditions is left by fourth processing in Step (1), this processing ends. FIG. 6 shows the module selection table 141 loaded with the result of the determination of the final selected numbers of the function modules by the module selection unit 140 in this example.

The module attaching/detaching part 150 attaches and detaches the function modules according to the module selection table 141. Specifically, as for the function modules described in the module selection table 141, instances of a number equivalent to their selected number are enabled. On the other hand, as for the function module not described in the module selection table 141, the instance is disabled. In this way, necessary resources are assigned only to the function modules required to implement the options and the parameters selected by the user, so that the resources can be used effectively.

Example 2

Subsequently, a simple operation example is given as Example 2, which shows how the selected number changes as the module selection unit 140 repeatedly performs the above processing in Steps (1) to (4). For ease of explanation, the resource usage and an available free resource space will be referred to simply as the usage and the free space, respectively. Moreover, each of the stages represents one cycle of the above processing. Those elements which are changed in the individual stages are shown enclosed in brackets "[ ]".

<Initial Stage>
Free space 80
Module A: Expand priority 2, usage 25, selected number 0,
Module B: Expand priority 1, usage 15, selected number 0.

<After First Stage Processing>
Free space [55]
Module A: Expand priority [1], usage 25, selected number [1],
Module B: Expand priority 1, usage 15, selected number 0.

<After Second Stage Processing>
Free space [30]
Module A: Expand priority [0], usage 25, selected number [2],
Module B: Expand priority 1, usage 15, selected number 0.

<After Processing in Step S7 of Third Stage>
Free space [15]
Module A: Expand priority 0, usage 25, selected number 2,
Module B: Expand priority [0], usage 15, selected number [1].

<After Third Stage Processing>
Free space 15
Module A: Expand priority [2], usage 25, selected number 2,
Module B: Expand priority [1], usage 15, selected number 1.

Since all the expand priorities become 0 in the final step of an expansion algorithm, they are replaced with the initial values.

<After Fourth Stage Processing>
Free space [0]
Module A: Expand priority 2, usage 25, selected number 2,
Module B: Expand priority [0], usage 10, selected number [2].

Since the free space then becomes 0, the processing ends.

Unlike in the above example, "ratio of expand priority"="selected number" sometimes may not be inevitable depending on the relationships between the free space, expand priority, and usage. Specifically, this algorithm expands if there is a free space even though the expand priority is low.

If a plurality of function modules are expected to be expanded in a set, the module selection unit 140 can be generated in the manner shown in FIG. 7. Specifically, as for the function modules to be expanded in a set, their function module numbers and expand priorities are integrated, that is, the same function module number and expand priority are set. Moreover, the selected number upper limit value is unified to the lower of these values. Furthermore, the memory usage and the CPU use rate are changed to the sum of the respective memory usages and CPU use rates of the function modules concerned. FIG. 7 shows an example of the module selection table 141 for the case in which a preprocessing module and a prefetching module are expanded in a set. For example, this processing can be performed if there are relationships between a plurality of function modules and if the effect of expansion cannot be obtained unless they are expanded in a set.

FIG. 7 shows an example of the module selection table 141 in which one preprocessing module and one prefetching module are related to each other. If the correspondence between the modules is not one-to-one, in contrast, it may sometimes be necessary to combine two modules B with one module A, for example. In this case, the memory usage and the CPU use rate are changed to values obtained by adding up those of the modules A and B at a ratio of one to two. Moreover, if the selected number of the modules B is 1, for example, additional processing can be performed such that the number of modules is expanded by 2.

Figure 8:
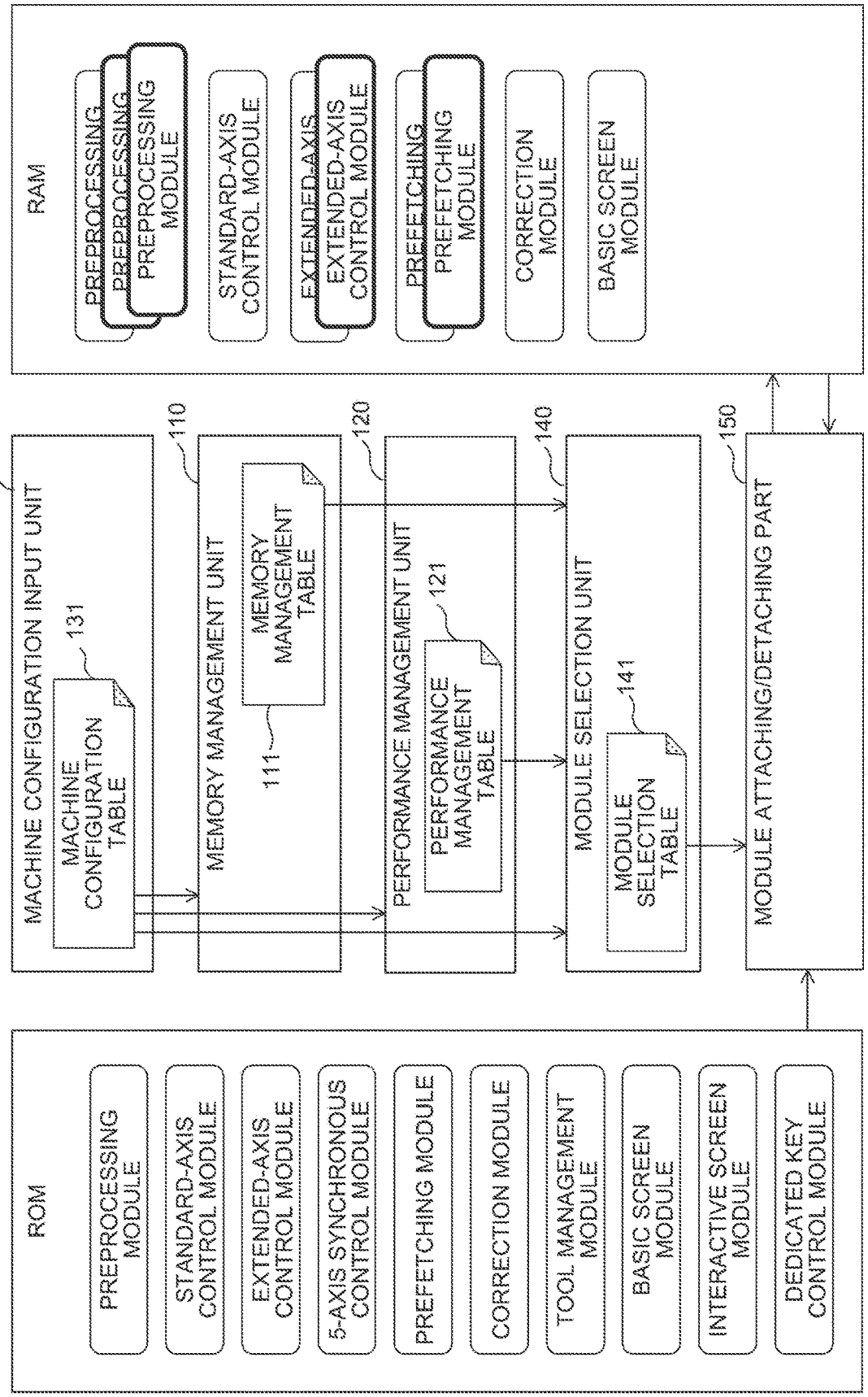
FIG. 8 is a diagram showing a state in which resources are assigned to function modules by the numerical controller shown in FIG. 1.

FIG. 8 shows a state in which the resources are assigned to the function modules by the numerical controller 100 according to the present embodiment. Thus, in the present embodiment, the resources based on the expand priority are assigned to the function modules selected by the user. In contrast, no resources are assigned to those function modules which are not selected by the user.

Figure 9:
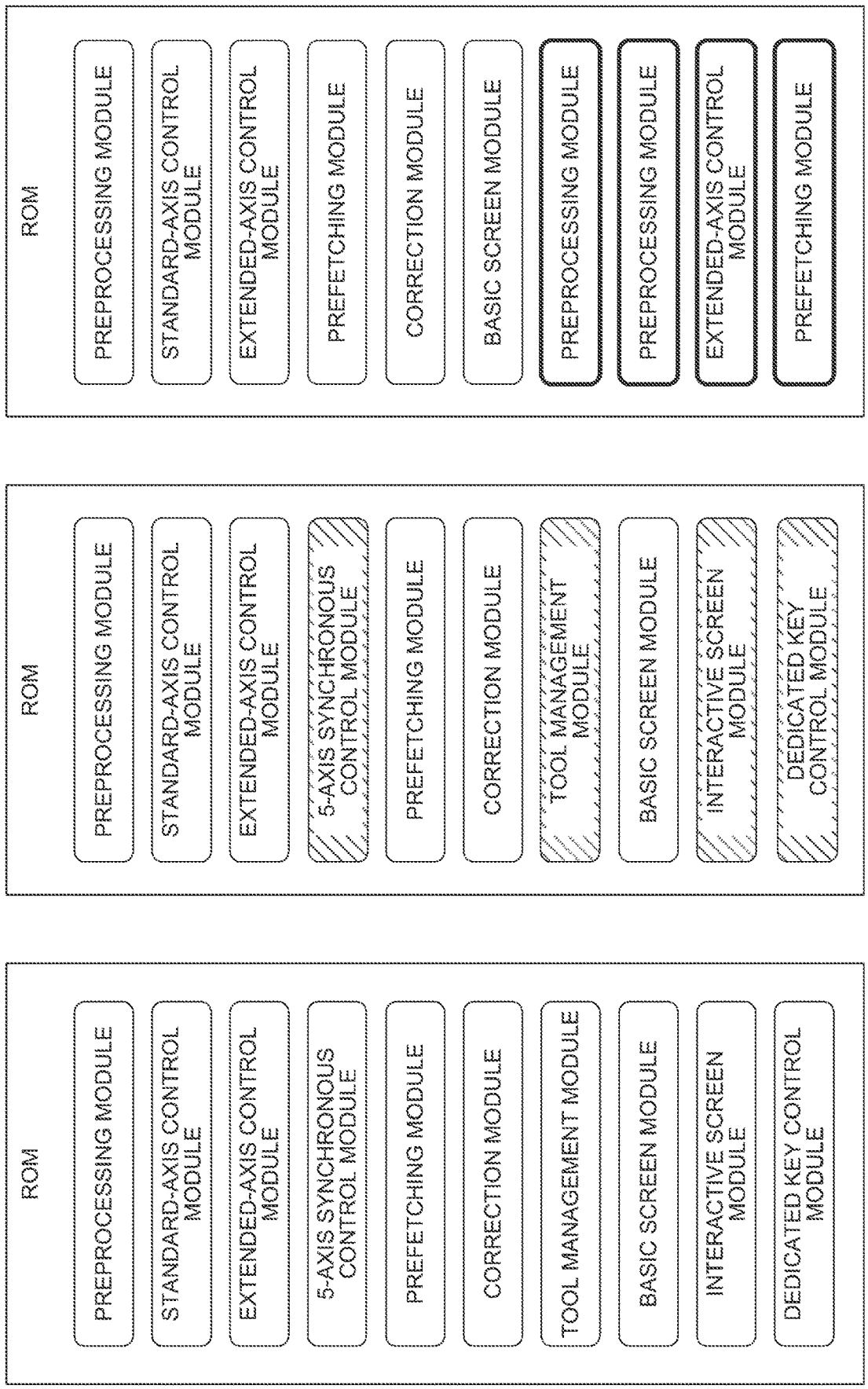
FIG. 9 is a comparison diagram showing the results of resource assignment in a conventional numerical controller and the numerical controller of FIG. 1.

FIG. 9 is a comparison diagram showing the results of resource assignment in a conventional numerical controller and the numerical controller 100 according to the present embodiment. The left-hand diagram of FIG. 9 shows the result of resource assignment in the conventional numerical controller. This method has an advantage in versatility, since various function modules are included in each program and the resources are assigned to all the function modules. However, the performance limit of each individual function module is low. The right-hand and center diagrams of FIG. 9 show the results of resource assignment in the numerical controller 100 according to the present embodiment. In this method, as shown in the center diagram of FIG. 9, no resources are assigned to those function modules which are not selected by the user. Instead, the resources based on the expand priority are assigned to the function modules selected by the user. In this way, the performance of the function selected by the user can be maximized without damaging the flexibility of the user's function selection. Thus, for the function selected by the user, some advantages can be obtained such as the improvement in processing speed, suppression of machining stop frequency, and improvement in machining accuracy.

The present invention is not limited to the above-described embodiment and may be suitably modified without departing from the spirit of the invention. Any of the constituent elements of the embodiment may be modified or omitted without departing from the scope of the invention.

The invention claimed is:

1. A numerical controller configured to assign resources to a plurality of function modules, the numerical controller comprising:
   a machine configuration input unit configured to generate the machine configuration table in which the function modules to be enabled are set based on an option or a parameter selected by a user;
   a memory management unit configured to generate a memory management table for managing a memory usage;
   a performance management unit configured to generate a performance management table for managing a CPU use rate;
   a module selection unit configured to determine selected numbers of the function modules, based on the machine configuration table, the memory management table, and the performance management table, and generate a module selection table; and
   a module attaching/detaching part configured to attach and detach the function modules according to the selected numbers of the function modules.

2. The numerical controller according to claim 1, wherein the machine configuration input unit generates the machine configuration table in which the function modules to be enabled and the selected number, a priority, and a selected number upper limit value of each of the function modules are set.

3. The numerical controller according to claim 1, wherein the memory management unit generates the memory management table for managing the memory usage and a free memory amount.

4. The numerical controller according to claim 1, wherein the performance management unit generates the performance management table for managing the CPU use rate and a free CPU use rate.

* * * * *